US008892864B2

(12) United States Patent
Sainath et al.

(10) Patent No.: US 8,892,864 B2
(45) Date of Patent: *Nov. 18, 2014

(54) METHOD FOR SEPARATING A DIVIDABLE COMPUTER DEVICE INTO MULTIPLE SUB-COMPUTERS WITH PREDETERMINED FEATURES AND FUNCTIONALITY LOADED BEFORE THE SEPARATION UPON USER'S SELECTION (75) Inventors: Tara N. Sainath, Yorktown Heights, NY (US); Dimitri Kanevsky, Yorktown Heights, NY (US); Sasha P. Caskey, Yorktown Heights, NY (US); Ossama S. Emam, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/463,344

(22) Filed: May 3, 2012

(65) Prior Publication Data
US 2013/0145143 A1 Jun. 6, 2013

Related U.S. Application Data (63) Continuation of application No. 13/310,225, filed on Dec. 2, 2011.

(51) Int. Cl.
*G06F 1/24* (2006.01)
*G06F 9/00* (2006.01)
*G06F 1/16* (2006.01)

(52) U.S. Cl.
CPC ............... *G06F 9/00* (2013.01); *G06F 1/1692* (2013.01)
USPC ........................................................ 713/100

(58) Field of Classification Search
CPC ...... G06F 1/1692; G06F 3/04886; G06F 9/00
See application file for complete search history.

(56) References Cited

U.S. PATENT DOCUMENTS

| 5,796,684 | A | * | 8/1998 | Yaegashi | 709/230 |
|---|---|---|---|---|---|
| 7,636,794 | B2 | | 12/2009 | Ramos et al. | |
| 2003/0112585 | A1 | * | 6/2003 | Silvester | 361/679 |
| 2009/0024792 | A1 | * | 1/2009 | Arai et al. | 711/114 |
| 2009/0322689 | A1 | * | 12/2009 | Kwong et al. | 345/173 |
| 2010/0156913 | A1 | | 6/2010 | Ortega | |

(Continued)

FOREIGN PATENT DOCUMENTS

| CA | 2750668 A1 | 2/2013 |
|---|---|---|
| GB | 2470625 A | 12/2010 |

OTHER PUBLICATIONS

Tandler et al, "ConnecTables: Dynamic Coupling of Displays for the Flexible Creation of Shared Workspaces ",Proceedings of the 14th annual ACM symposium on User interface software and technology, 2001.*
UK Patent Office, Search Report dated May 15, 2013 (pp. 1-14).

(Continued)

*Primary Examiner* — Thomas Lee
*Assistant Examiner* — Zhipeng Wang
(74) *Attorney, Agent, or Firm* — Charles L. Moore; Moore & Van Allen PLLC (57) ABSTRACT

A method for separating a dividable computer device into multiple sub-computers may include receiving, by the dividable computer device, a command to separate a sub-computer from the dividable computer device. The method may also include detecting by the dividable computer device separation of the sub-computer and reconfiguring the dividable computer device for operation without the separated sub-computer in response to each sub-computer being separated.

17 Claims, 7 Drawing Sheets (56) References Cited

U.S. PATENT DOCUMENTS

| | | | | |
|---|---|---|---|---|
| 2010/0306501 | A1* | 12/2010 | Chang et al. | 712/31 |
| 2011/0047459 | A1* | 2/2011 | Van Der Westhuizen | 715/702 |
| 2011/0131435 | A1 | 6/2011 | Kitahara | |
| 2012/0087078 | A1 | 4/2012 | Medica | |
| 2012/0321144 | A1* | 12/2012 | Choong et al. | 382/118 |

OTHER PUBLICATIONS

Tandler, Peter, et al., ConnecTables: Dynamic Coupling of Displays for the Flexible Creation of Shared Workspaces, Proceedings of the 14th Annual ACM Symposium on User Interface Software and Technology, ACM Press (CHI Letters 3(2)), 2001, pp. 11-20.

Hinckley, Ken, Bumping Objects Together as a Semantically Rich Way of Forming Connections between Ubiquitous Devices, Proceedings of Ubicomp, Microsoft, 2003.

IBM Research, MetaPad, Pervasive, Mobile, Wearable Computing, www.research.ibm.com/wearablecomputing/metapad/meta..., Apr. 9, 2012, page last updated May 2005, pp. 1-2.

* cited by examiner

METHOD FOR SEPARATING A DIVIDABLE COMPUTER DEVICE INTO MULTIPLE SUB-COMPUTERS WITH PREDETERMINED FEATURES AND FUNCTIONALITY LOADED BEFORE THE SEPARATION UPON USER'S SELECTION

CROSS REFERENCE TO RELATED APPLICATION

This application is a continuation application of U.S. patent application Ser. No. 13/310,225, filed Dec. 2, 2011, the contents of which are incorporated herein by reference.

BACKGROUND

Aspects of the present invention relate to computer devices, mobile computer devices and similar devices, and more particularly to a computer device that is separable into multiple sub-computers.

Under certain circumstances, each person having their own computer for their own personal needs may be beneficial. For example, members of a family on a trip may each desire to have their own computer device. However, carrying around multiple laptops or other type mobile computing devices may require a significant amount of storage for individual devices, as well as the need to keep track of each individual device. There is also the time and expense of maintaining multiple computing devices.

BRIEF SUMMARY

According to an aspect of the present invention, a method for separating a dividable computer device into multiple sub-computers may include receiving, by the dividable computer device, a command to separate a sub-computer from the dividable computer device. The method may also include detecting by the dividable computer device separation of the sub-computer and reconfiguring the dividable computer device for operation without the separated sub-computer in response to the sub-computer being separated.

According to another aspect of the present invention, a dividable computer device may include a plurality of separable sub-computers. At least one of the plurality of separable sub-computers may include a processing unit. The dividable computer device may also include a module to detect separation of each separable sub-computer and a module to reconfigure the dividable computer device for operation without the separated sub-computer in response to each sub-computer being separated.

According to a further aspect of the present invention, a A computer program product for separating a dividable computer device into multiple sub-computers may include a computer readable storage medium having computer readable program code embodied therewith. The computer readable program code may include computer readable program code configured to receive a command to separate a sub-computer from the dividable computer device. The computer readable program code may also include computer readable program code configured to detect by the dividable computer device separation of the sub-computer from the dividable computer device. The computer readable program code may also include computer readable program code configured to reconfigure the dividable computer device for operation without the separated sub-computer in response to the sub-computer being separated.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A main computer or dividable computer device may be separated into multiple sub-computers. When a sub-computer is needed, a user may "break off" or separate a component or sub-computer portion of the main computer or dividable computer device. The sub-computer, albeit smaller than the original computer device, may include a processor, a memory and complete independent functionality. When the user is finished using the sub-computer, the sub-computer may be re-attached to the main computer.

Thus the main computer can be thought of as having multiple sub-computers with multiple interconnected motherboards, computer processing units (CPUs) and memory. The number of sub-computers available may be defined by the user, for example, devices can be made with 4, 6, 8 or any number of sub-computers.

In addition, when sub-computers are added or subtracted from the main computer, the screen or display of the main computer may be adjusted so that it does not appear as though there is a "hole" or missing portion of the main computer or missing content in the display.

Forming a dividable computer or computer device can be done either by dividing the computer into blocks or segments each forming a sub-computer. Each block may preserve the original thickness of the dividable computer device but lengths of vertical and horizontal sides are reduced compared to the complete or assembled computer. An example of this embodiment will be described with reference to FIGS. 2A-2C.

In another embodiment, the dividable computer may be divided into parallel portions with the same length of sides and a reduced thickness. An example of this embodiment will be described with reference to FIG. 3.

The computer can also be split or divided virtually where certain commands will split the computer so multiple users can each have their own computer or sub-computer and operating system running on a section of the screen. Each section will run its own virtual operating system and accept input from a virtual keyboard and touch interface. The separate computers may be connected for communication with one another through a network, such as a wireless network.

Each sub-computer may include a memory and a wireless communications device or transceiver to interconnect the sub-computers via wirelesses links. Accordingly, if one sub-computer needs information that is stored in another sub-computer, the sub-computer can access the information via the wireless link. Some sub-computers into which the dividable computer may be separated may be considered as clients and some sub-computers could be considered as a server and contain, for example, a main memory.

Most processes may run on a single sub-computer, if however, a process needs more computing power the process or portion of the process may be farmed or shared with another one of the wirelessly interconnected sub-computers. This would allow any of the sub-computers to take advantage of the full processing power of the computer as if it were complete or partially complete or assembled.

When a dividable computer is separated each sub-computer may be provided with a virtual operating system (OS) and an option of using a copy of an existing instance of the OS or choosing to load a personalized image of the OS. This allows the dividable computer to pre-load relevant data into the sub-computer before it is separated or split from the main or dividable computer, allowing a more efficient and personalized startup mechanism. For example if one of the split sub-computers is going to a child, the sub-computer may be pre-loaded with games and documents that the child uses and likes.

Figure 1:
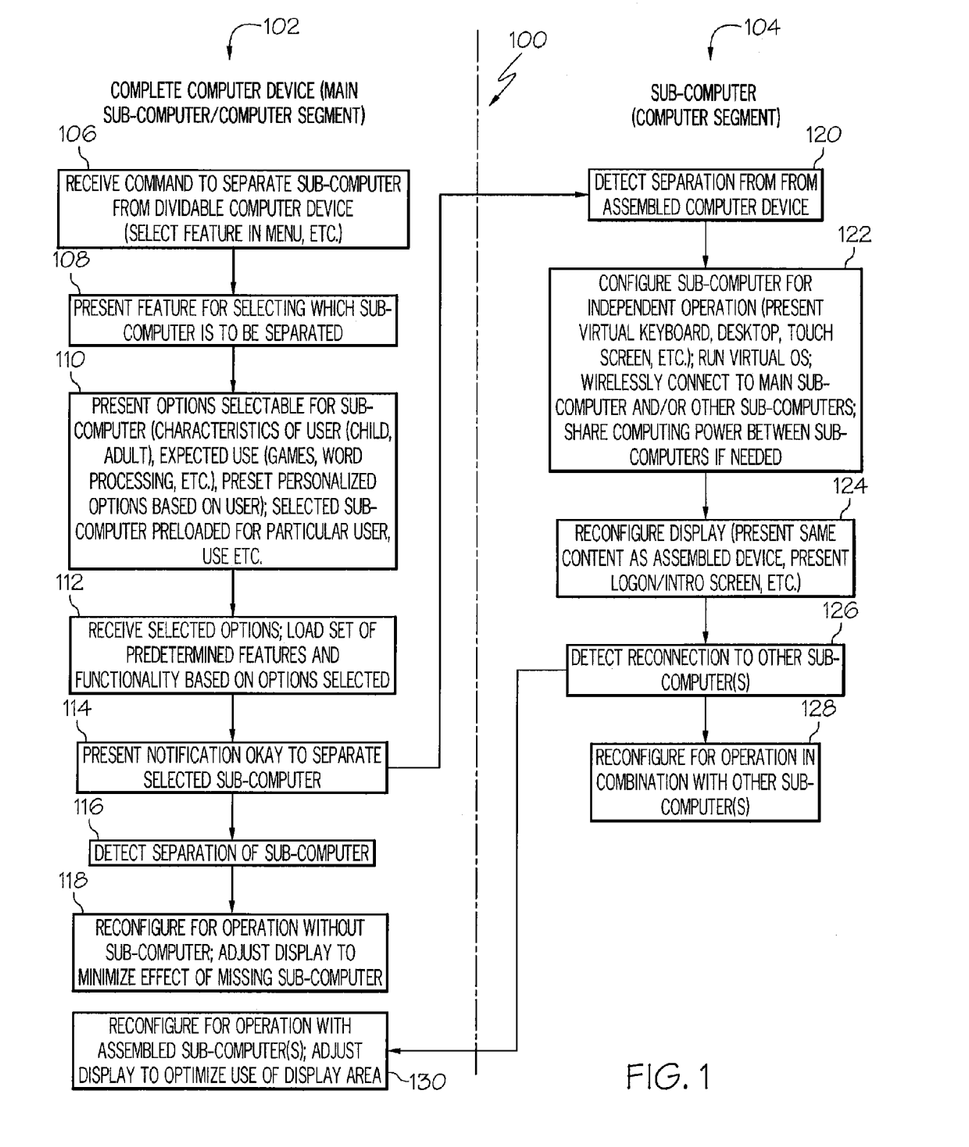
FIG. 1 is a flow chart of an example of a method for separating a dividable computer device into multiple sub-computers of in accordance with an embodiment of the present invention.

FIG. 1 is a flow chart of an example of a method 100 for separating a dividable computer device into multiple sub-computers in accordance with an embodiment of the present invention. An example of a dividable computer device 200 that is separable into multiple sub-computers 202a-202d will be described with reference to FIGS. 2A-2C herein. The flow chart in FIG. 1 is divided into functions or operations 102, that may be performed by the complete or assembled dividable computer device 200 or may be performed by a main sub-computer, master sub-computer, server sub-computer or other designated computer segment or portion of the dividable computer device 200, and functions or operations 104 that may be performed by each sub-computer 202a-202d or computer segment or portion of the dividable computer device 200.

Figure 2A:
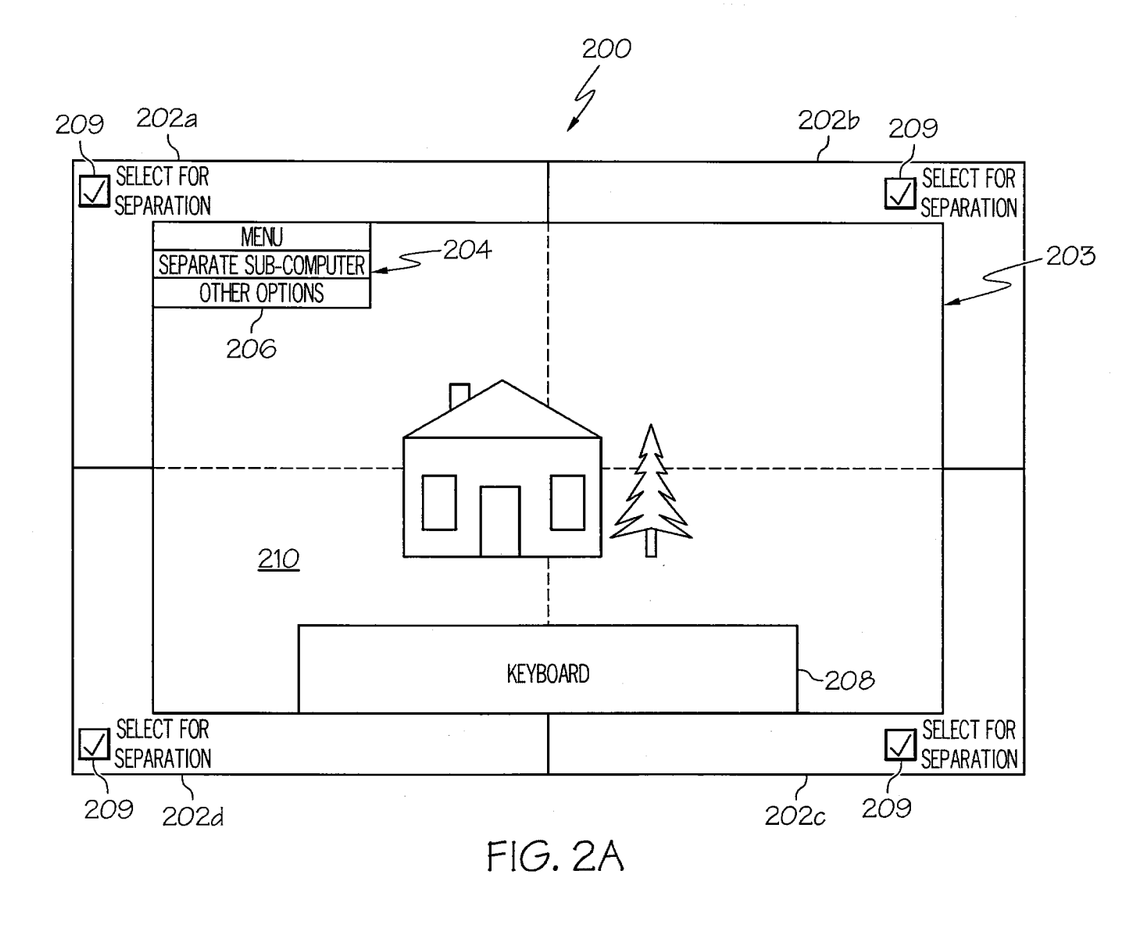
FIG. 2A is a representation of an example of a dividable computer device that is separable into multiple sub-computers in accordance with an embodiment of the present invention.

In block 106, a command may be received by the dividable computer device to divide or separate a sub-computer from the dividable computer device or to divide or separate the device into multiple sub-computers. The command may be provided by selecting a feature in a menu using a computer pointing device or by any other means of selecting or activating an operation known in the computing arts. For example, a drop down menu 204 is illustrated in FIG. 2A including an option 206 that may be selected by a user to separate the dividable computer device 200 into one or more sub-computers 202a-202d.

In block 108, a feature may be presented for selecting which sub-computer or sub-computers are to be separated. This feature may also include a menu similar to menu 204 in FIG. 2A allowing selection of the sub-computers 202a-202d that the user desires to separate from the dividable computer device 200. In another embodiment, a check box 209 may be provided in a display of each sub-computer 202a-202d to select which one or ones of the sub-computers are to be separated.

In block 110, a plurality of options may be presented for selection by the user for association or for configuring the sub-computer being separated. A set of predetermined features and functionality may be loaded on the sub-computer to be separated based on the options selected. In this way, each sub-computer to be separated may be configured or loaded with the set of predetermined features and functionality based on the options selected. For example, characteristics of the intended user of the sub-computer may be selected. The sub-computer may then be loaded with the set of predetermined features, functionality and applications based on the selected characteristics of the intended user of the sub-computer. To further this example, if the intended user is a child, then games or other features and functionality of interest to a child may be loaded on the sub-computer. If the intended user and is an adult, then applications, features, functions and applications of interest or to be used by the adult user may be loaded on the sub-computer.

In another example, the plurality of options for selection for association with the sub-computer or for configuring the sub-computer to be separated may include presenting a list of potential users of the sub-computer for selection. The sub computer may then be loaded with the predetermined features, functionality and applications based on the selected user. The plurality of options for selection for association with the sub-computer or for configuring the sub-computer to be separated may also include presenting a list of intended or expected uses of the sub-computer for selection. The sub-computer may then be loaded with the predetermined features, functionality and applications based on the selected use of the sub-computer.

In another embodiment, each of the sub-computers may be pre-loaded with a standard set of features, functionality and applications. Alternatively or in addition, each sub-computer may be pre-loaded with a predetermined set of features, functionality and applications based on the intended or expected use or user.

The sub-computer to be separated may also be provided with a virtual operating system. A virtual operating system may be an operating system running on a virtual machine. A virtual machine is a software implementation of a machine (i.e. a computer) that executes programs like a physical machine. A virtual machine allows a variety of operating systems to run on the same machine without requiring that the operating system be ported to that specific machine (set of instructions specific to that hardware). In another embodiment, an option may be presented for the user to select to use a copy of an instance of the operating system for the dividable computer device or main sub-computer on the separated sub-computer or to load a personalized image of the operating system on the sub-computer.

In block 112, the selected options may be received by the dividable computer device and the predetermined features, functionality and applications based on the options selected may be loaded on the sub-computer or each of the sub-computers to be separated. The process of selecting the options for configuring each sub-computer may loop through each sub-computer selected to be removed or separated from the dividable computer device.

In block 114, a notification may be presented to the user that it is permissible to separate the selected sub-computer or sub-computers. In block 116, separation of each sub-computer to be separated may be detected in response to each sub-computer being removed or separated from the other sub-computers forming the dividable computer device.

In block 118, the remaining sub-computers forming the dividable computer device may be reconfigured for operation without the sub-computer or sub-computers which have been removed. For example, the display or screen may be dynamically adjusted to minimize the effect of the missing sub-computer or sub-computers and to optimize the use of the remaining available display area for presenting content. Accordingly, a single screen may be broken apart to create multiple computers or sub-computers each having their own screen or sub-screen. The operating system, any active applications, file system or memory may also be automatically adjusted or modified to compensate for the missing sub-computer or sub-computers and to substantially transparently maintain the functionality of the remaining sub-computer or sub-computers forming the dividable computer device.

In block 120, the separated sub-computer may detect separation from the dividable computer device.

In block 122, the sub-computer may be dynamically or automatically reconfigured for independent operation separate from the dividable computer device or remaining sub-computers forming the dividable computer device. For example, a virtual keyboard, desktop, touch screen and similar features may be presented on a display or screen of the separated sub-computer. As previously discussed, the sub-computer may run a virtual operating system, a copy of an instance of the operating system or a personalized image of the operating system which was pre-loaded on the sub-computer or was loaded on the sub-computer prior to separation from the dividable computer device.

As described in more detail herein, each separated sub-computer may be wirelessly connected to the other sub-computers or to a main sub-computer and the other separated sub-computers by a wireless communications link or channel. For example, each sub-computer may include a transceiver for wireless communications with the other sub-computers. The sub-computers may then share data that may be stored in the memory of certain sub-computers and may share computing power or capacity between the sub-computers if needed.

In block 124, the display or screen of the separated sub-computer may be reconfigured. The display or screen may present the same content that was presented when all of the sub-computers were assembled to form the dividable computer device and prior to separation of the sub-computer. In another embodiment, the display or screen of the separated sub-computer may present a logon screen, introduction screen or similar content in response to being separated from the dividable computer device or other separable sub-computers.

In block 126, the separated sub-computer may detect reconnection to another sub-computer or reconnection to the other sub-computers by the user to again form the dividable computer device.

In block 128, the sub-computer may be reconfigured for operation in combination with the other sub-computer or sub-computers in response to detecting reconnection with the other sub-computers. For example, the display or screen of the reconnected sub-computer may be dynamically or automatically adjusted for displaying content in association with the other sub-computers in response to detecting reconnection to the other sub-computers or dividable computer device.

In block 130, the recombined or reconnected sub-computers may be reconfigured for operation with the newly reconnected sub-computer. For example, the display or screen may be dynamically or automatically adjusted to optimize use of the display area in presenting content in response to detecting reconnection of the sub-computer. The content being displayed on a main sub-computer or combination of two or more recombined sub-computers may have priority over any content being displayed by the newly reconnected sub-computer. Accordingly, the display of the newly recombined sub-computer may be dynamically or automatically adjusted to display the priority content in coordination with the previously reconnected sub-computers.

Figure 2B:
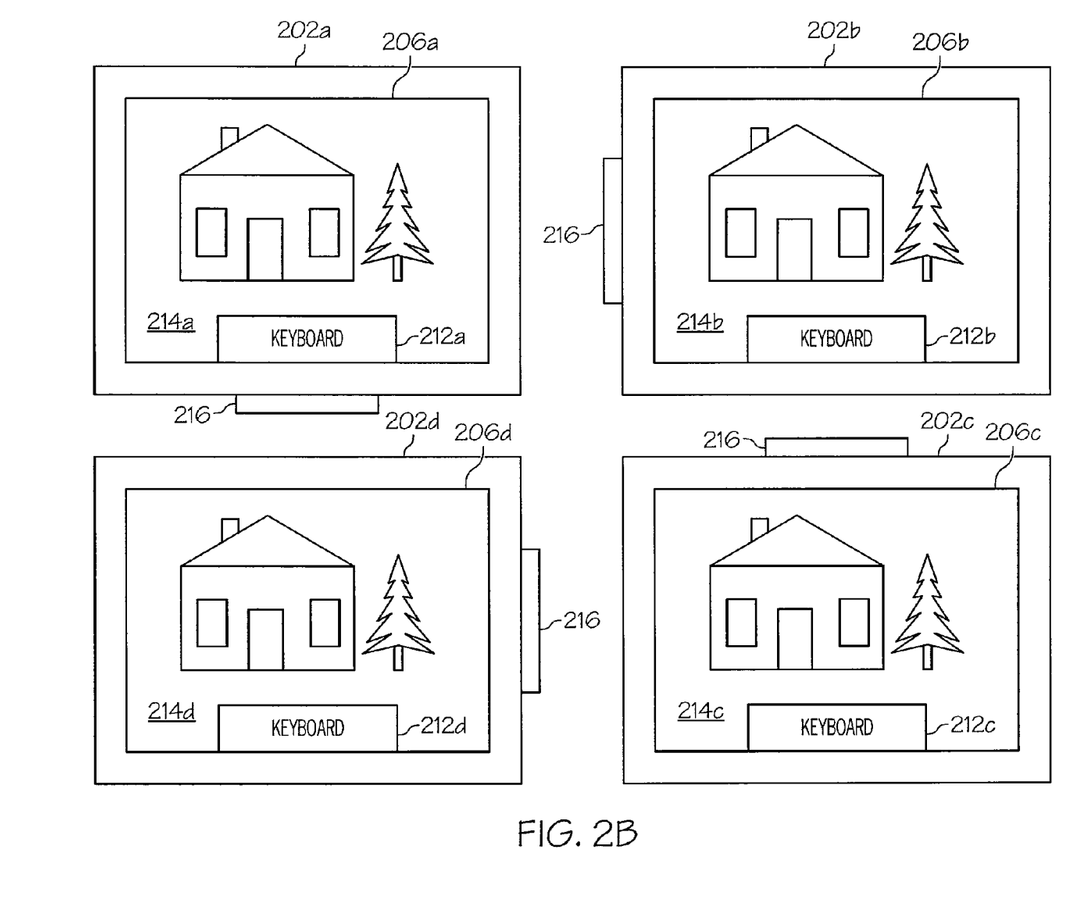
FIG. 2B is a representation of the example of the dividable computer device of FIG. 2A separated into the multiple sub-computers in accordance with an embodiment of the present invention.

As previously discussed, FIG. 2A is a representation of an example of a dividable computer device 200 that is separable into multiple sub-computers 202a-202d in accordance with an embodiment of the present invention. A display 203 of the dividable computer device 200 is illustrated in FIG. 2A with the multiple sub-computers 202a-202d assembled. FIG. 2B is a representation of the example of the dividable computer device 200 of FIG. 2A separated into the multiple sub-computers 202a-202d in accordance with an embodiment of the present invention. The display 206a-206d of each separated sub-computer is illustrated in FIG. 2B. The method 100 may be embodied in and performed by each of the sub-computers 202a-202d or portions of the method 100 may be embodied in and performed by predetermined ones of the sub-computers 202a-202d.

The dividable computer device 200 may include a virtual keyboard 208 presented on a touch screen 210 for allowing the user to interface with the dividable computer device 200. As illustrated in FIG. 2B, each of the separated sub-computers 202a-202d may include a virtual keyboard 212a-212d presented on a touch screen 214a-214d for respective users to interface with each of the separated sub-computers 202a-202d.

As previously discussed, the display or touch screen 214a-214d of each separated sub-computer 202a-200d may be adjusted to present content and may present the same content as presented on the dividable computer device 200 prior to separation of any of the sub-computers 202a-202d as illustrated in FIG. 2A. The separated sub-computers 202a-202d do not necessarily have to present the same content as the dividable computer device 200 and may present other content, such as a logon screen, introduction screen or other content.

Figure 6:
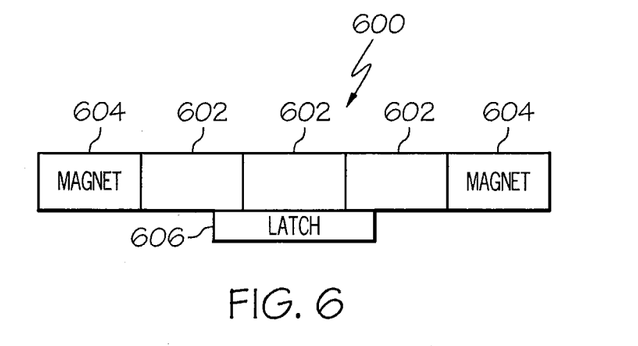
FIG. 6 is a block diagram of an example of an interface connector for mechanically and electrically connecting sub-computers together to from a dividable computer device in accordance with an embodiment of the present invention.

Each of the sub-computers 202a-202d may also include an interface connector 216 for mechanically and electrically connecting each sub-computer 202a-202d to one another to form the dividable computer device 200 as illustrated in FIG. 2A. While the interface connector 216 is shown in FIG. 2B as being located on a side of each sub-computer 202a-202d, the interface connector 216 maybe located anywhere on each sub-computer 202a-202d to facilitate easy separation and reconnection of each sub-computer 202a-202d. An example of an interface connector 600 in accordance with an embodiment of the present invention that may be used for the interface connector 216 is illustrated in FIG. 6. The interface connector 600 may include a plurality of electrical contacts 602 for making contact with similar electrical contacts on another sub-computer 202a-202d. The interface connector 600 may also include one or more magnets 604 for magnetically latching to mating magnets on another sub-computer 202a-202d to retain the electrical contacts 602 in contact with the mating electrical contacts of an adjacent sub-computer 202a-202d when the sub-computers are assembled to form the dividable computer device 200. The electrical contacts 602 may be disposed linearly adjacent to one another with a latching magnet 604 on each end of the linearly disposed electrical contacts 602 as illustrated in FIG. 6. A mechanical latching mechanism 606 may also be provided for securing or locking two adjacent sub-computers 202a-202d to one another to form the dividable computer device 200. Other contact configurations and latching mechanisms are also within the scope of the invention and any arrangement to releasably retain the sub-computers 202a-202d in an assembly to form the dividable computer device 200 may be used.

Figure 2C:
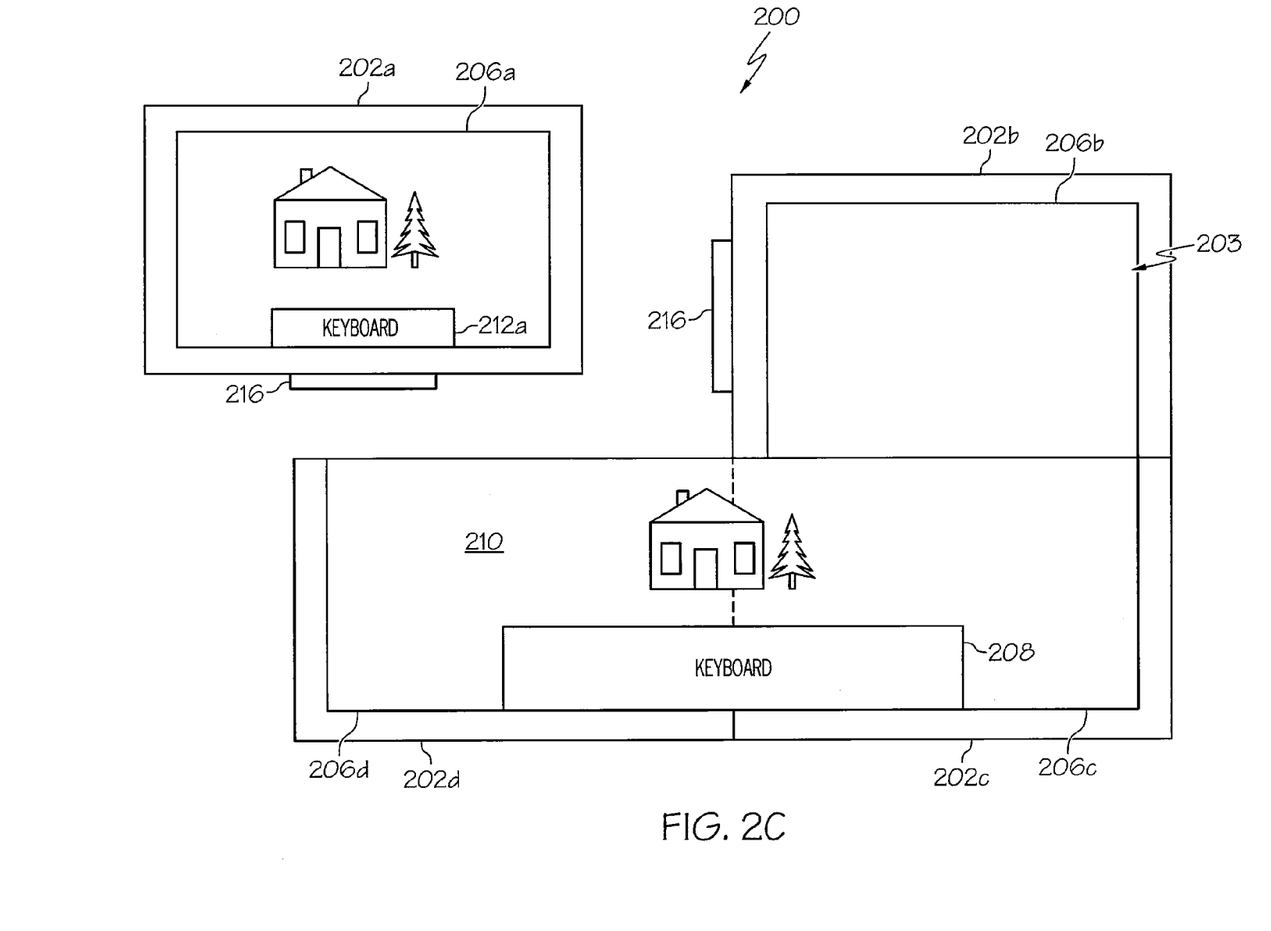
FIG. 2C is a representation of the example of the dividable computer device of FIG. 2A with one sub-computer separated from the dividable computer device illustrating the display of the dividable computer device and the one separated sub-computer in accordance with an embodiment of the present invention.

FIG. 2C is a representation of the example of the dividable computer device 200 of FIG. 2A with one sub-computer 202a separated from the dividable computer device 200 in accordance with an embodiment of the present invention. The display 203 of the dividable computer device 200 and the display 214a of the one separated sub-computer 202a are illustrated in FIG. 2C. As illustrated in FIG. 2C, the display 203 of the dividable computer device 200 may be adjusted to optimize the display area for presentation of the content. The display 206a of the separated sub-computer 202a may also be configured to display the content. In the example illustrated in FIG. 2C the display 206a of the separated sub-computer 202a is presenting the same content as the dividable computer device 200; although, the separated sub-computer 202a may display other content similar to that previously described.

While the exemplary dividable computer device 200 illustrated in FIGS. 2A-2C is illustrated as including four sub-computers 202a-202d, the dividable computer device 200 may include any number of sub-computers that can practically be electrically and mechanically interconnected to form the dividable computer device.

Figure 3:
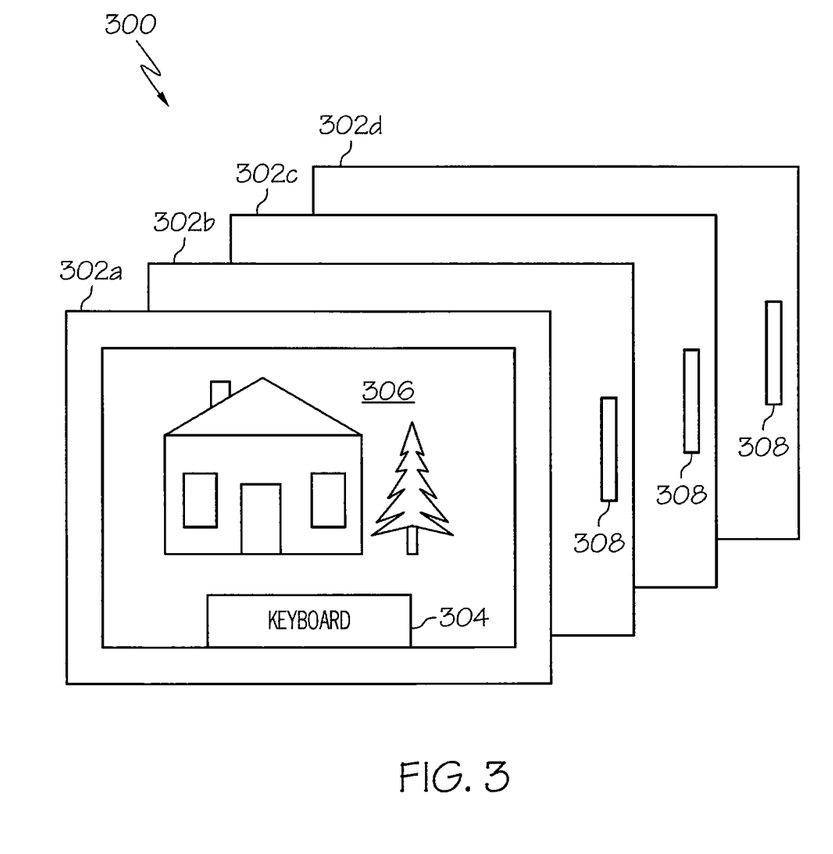
FIG. 3 is a representation of an example of a dividable computer device separable into multiple sub-computers in accordance with another embodiment of the present invention.

FIG. 3 is a representation of an example of a dividable computer device 300 separable into multiple sub-computers 302a-302d in accordance with another embodiment of the present invention. Each of the sub-computers 302a-302d may be stacked on one another as illustrated in FIG. 3 rather than interconnected adjacent to one another as illustrated in the embodiment in FIG. 2A. Accordingly, the sub-computers 302a-302d may be divided into parallel components or sub-computers with the same length of sides and a reduced thickness as illustrated in FIG. 3. Each of the sub-computers 302a-302d may include a virtual keyboard 304 on a touch screen 306 to permit a user to interface with each of the sub-computers 302a-302d. Each of the sub-computers 302a-302d may also include at least one interface connector 308 for mechanically and electrically connecting the sub-computers 302a-302d together to form the dividable computer device 300. The top sub-computer or main sub-computer 302a would not necessarily need an interface connector 308 although the sub-computers 302a-302d would be interchangeable in the stack of sub computers if all the sub-computers included an interface connector 308. The interface connector 308 may be substantially the same as the exemplary interface connector 600 illustrated in FIG. 6.

While the exemplary dividable computer device 300 is illustrated in FIG. 3 as including four sub-computers 302a-302d, the dividable computer device 300 may include any number of sub-computers that may be practically physically and electrically connected together to form the dividable computer device 300.

Figure 4:
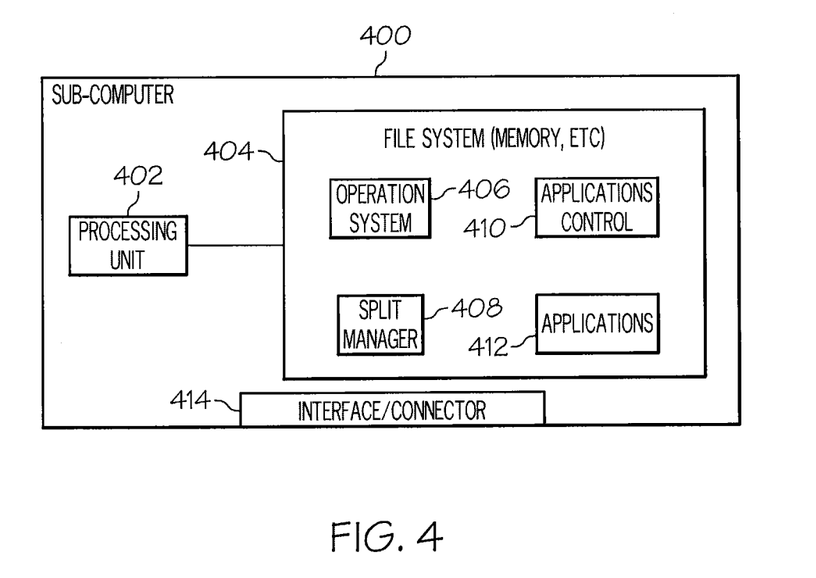
FIG. 4 is a block schematic diagram of an example of a sub-computer of a dividable computer device in accordance with an embodiment of the present invention.

FIG. 4 is a block schematic diagram of an example of a sub-computer 400 of a dividable computer device separable into multiple sub-computers 400 in accordance with an embodiment of the present invention. The sub-computer 400 may be used for each of the sub-computers 202a-202d in FIGS. 2A-2C and each of the sub-computers 302a-302d in FIG. 3. The method 100 or portions of the method 100 may be embodied in and performed by the sub-computer 400.

The sub-computer 400 may include a processing unit 402 and a file system 404 or memory. The file system 404 may include an operating system 406 for controlling operation of the sub-computer 400. The file system 404 may also include a split manager 408 and an applications control module 410. The split manager 408 may control separation of the sub-computer 400 from other sub-computers forming a dividable computer device and reconnection of the sub-computer 400 with the other sub-computers to reform the dividable computer device, such as dividable computer device 200 in FIG. 2A or dividable computer device 300 and FIG. 3.

The application control module 410 may control operation of applications while the sub-computer 400 is connected to other sub-computers to form the dividable computer device and while the sub-computer 400 is separated from the other sub-computers for independent operation of the sub-computer. The application control module 410 may also control loading of applications in response to the sub-computer 400 being separated from the dividable computer device and in response to the sub-computer 400 being reconnected to other sub-computers to reform the dividable computer device.

The file system 404 may also store other applications 412 for use by the sub-computer 400. For example, applications may be pre-loaded for use by a particular user or type of user, such as an adult or a child. Applications may be pre-loaded for a particular use of the sub-computer 400 or applications for other purposes.

The sub-computer 400 may also include an interface connector 414 for mechanically and electrically releasably connecting the sub-computer 400 to other sub-computers to form the dividable computer device.

Figure 5:
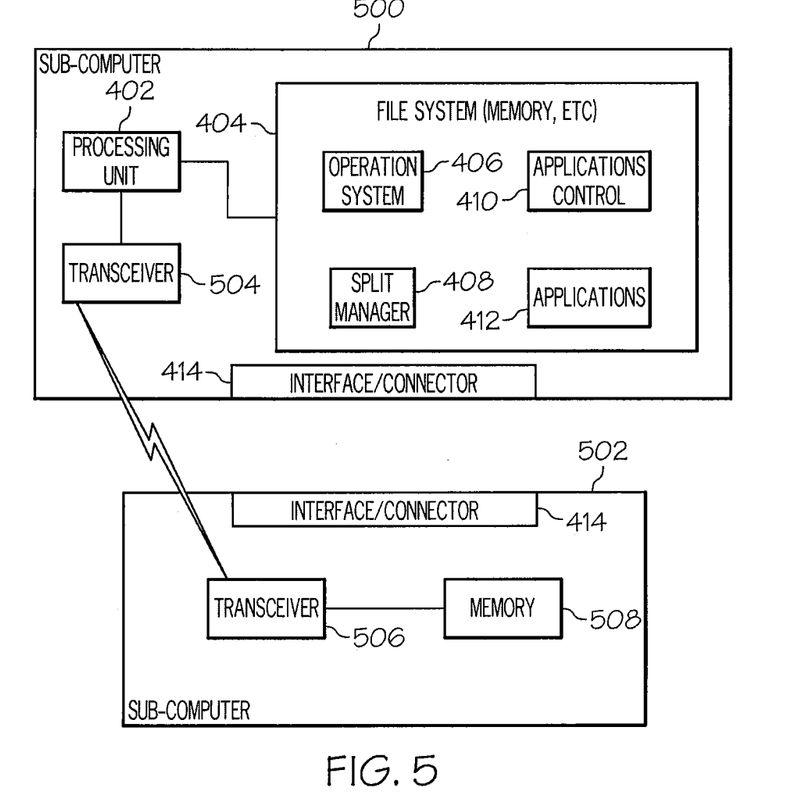
FIG. 5 is a block schematic diagram of an example of one sub-computer and one other sub-computer of a dividable computer device in accordance with an embodiment of the present invention.

FIG. 5 is a block schematic diagram of an example of one sub-computer 500 and one other sub-computer 502 of a dividable computer device in accordance with an embodiment of the present invention. The one sub-computer 500 may be a main sub-computer, master sub-computer, server sub-computer or similar sub-computer. The other sub-computer 502 may be a client sub-computer, slave sub-computer or similar sub-computer. In accordance with an embodiment of the present invention, a dividable computer device, such as the exemplary dividable computer device 200 in FIGS. 1A-1C or the exemplary computer device 300 in FIG. 3, may include one master or main sub-computer 500 and a plurality of client or slave sub-computers 502. Accordingly, the one sub-computer 500 may act or perform like a server and a plurality of other sub-computers 502 may act or perform like clients.

The main sub-computer 500 may be similar to the exemplary sub-computer 400 illustrated in FIG. 4 but may also include a transceiver 504 for wireless communications with the other sub-computer 502. The client sub-computer 502 may include a transceiver 506 for wireless communications with the main sub-computer 500 and with other client sub-computers 502. The client sub-computer 502 may also include a memory 508 for storing data. The transceiver 506 may be similar to the transceiver 504 in the main sub-computer 500. The client sub-computer 502 may utilize the wireless link or connection to access the processing unit 402 of the main sub-computer 500 for performing functions requested by a user of the client sub-computer 502.

The client sub-computer 502 may also include an interface connector 414 for mechanically and electrically connecting the client sub-computer 502 to the main sub-computer 500 and other client sub-computers 502 to form a dividable computer device similar to that described herein.

In another embodiment, the dividable computer device may include only a plurality of sub-computers similar to the main, master or server sub-computer 500.

The dividable computer device including multiple sub-computers described herein make it much easier and less expensive to maintain and update the dividable computer device and multiple sub-computers compared to a plurality of separate computer devices or laptop computers.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for separating a dividable computer device into multiple sub-computers, comprising:
   receiving, by the dividable computer device, a command to separate a sub-computer from the dividable computer device;
   presenting a feature on a display of the dividable computer device for selecting which sub-computer is to be separated from the dividable computer device in response to receiving the command to separate the sub-computer from the dividable computer device;
   selecting a particular one of the multiple sub-computers to be separated from the dividable computer device;
   presenting a plurality of options for selection for association with the particular sub-computer to be separated in response to selecting the particular sub-computer to be separated from the dividable computer device;
   loading a set of predetermined features and functionality on the particular sub-computer to be separated based on the options selected, the set of predetermined features and functionality being load on the particular sub-computer after the particular sub-computer is selected to be separated from the dividable computer device and before the selected sub-computer is separated from the dividable computer device, a notification being presented to a user that the selected sub-computer is ready to be separated from the dividable computer device;
   detecting by the dividable computer device separation of the sub-computer; and
   reconfiguring the dividable computer device for operation without the separated sub-computer in response to the sub-computer being separated.

2. The method of claim 1, wherein presenting the plurality of options for selection for association with the sub-computer to be separated comprises presenting a list of characteristics of a user for selection for association with the sub-computer, the method further comprising loading the sub-computer with predetermined features and functionality based on the selected user characteristics.

3. The method of claim 1, wherein presenting the plurality of options for selection for association with the sub-computer to be separated comprises presenting a list of users of the sub-computer for selection, the method further comprising loading the sub-computer with predetermined features and functionality based on the selected user.

4. The method of claim 1, wherein presenting the plurality of options for selection for association with the sub-computer to be separated comprises presenting a list of uses of the sub-computer for selection, the method further comprising loading the sub-computer with predetermined features and functionality based on the selected use of the sub-computer.

5. The method of claim 1, wherein reconfiguring the dividable computer device for operation without the separated sub-computer comprises adjusting the display of the dividable computer device to minimize an effect of the separated sub-computer.

6. The method of claim 1, further comprising providing a virtual operating system to the separated sub-computer.

7. The method of claim 1, further comprising presenting an option to one of use an existing copy of an instance of the operating system on the separated sub-computer and to load a personalized image of an operating system.

8. The method of claim 1, further comprising:
   detecting by the separated sub-computer removal from the dividable computer device; and
   reconfiguring the separated sub-computer for independent operation separate from the dividable computer device.

9. The method of claim 6, further comprising presenting a virtual keyboard on a touch screen of the separated sub-computer for operation of the separated sub-computer.

10. The method of claim 1, further comprising interconnecting the separated sub-computers with any other separated sub-computer and with the dividable computer device by a wireless network.

11. The method of claim 10, further comprising sharing resources between the one or more separated sub-computers using the wireless network to improve data processing.

12. The method of claim 1, further comprising breaking apart a single screen to create multiple computers each having their own screen.

13. The method of claim 12, further comprising displaying content on the screen of each respective separated sub-computer in response to being separated from the dividable computer device that is different from content presented on the screen of dividable computer device.

14. The method of claim 13, wherein the content presented on the screen of each respective separated sub-computer is one of a logon screen or an introduction screen.

15. The method of claim 1, wherein presenting the feature on the display of the dividable computer device for selecting which sub-computer is to be separated from the dividable computer comprises presenting a feature on each portion of the display associated with one of the multiple sub-computers, the feature on each portion of the display for selecting the associated sub-computer is to be separated from the dividable computer device.

16. The method of claim 1, wherein content being displayed by a main sub-computer or a combination of two or more undivided sub-computers has a priority over a content being displayed by a sub-computer being re-combined.

17. The method of claim 1, wherein the feature for selecting which sub-computer is to separate comprises at least one of a checkable box provided with each separable sub-computer and a menu allowing selection of the sub-computer by the user to be separated from the dividable computer device.

* * * * *